July 18, 1972  K. PALAC  3,677,791
METHOD OF DEPOSITING VITREOUS MATERIAL
ON A FACEPLATE PANEL
Filed July 6, 1970  2 Sheets-Sheet 1

INVENTOR
KAZIMIR PALAC
BY
ATTY

July 18, 1972  K. PALAC  3,677,791
METHOD OF DEPOSITING VITREOUS MATERIAL
ON A FACEPLATE PANEL
Filed July 6, 1970  2 Sheets-Sheet 2

INVENTOR
KAZIMIR PALAC
BY Lester N. Arnold
ATTY.

United States Patent Office 3,677,791
Patented July 18, 1972

3,677,791
METHOD OF DEPOSITING VITREOUS MATERIAL ON A FACEPLATE PANEL
Kazimir Palac, Carpentersville, Ill., assignor to Motorola, Inc., Franklin Park, Ill.
Filed July 6, 1970, Ser. No. 52,324
Int. Cl. B44d 5/06
U.S. Cl. 117—33.5 CM
4 Claims

ABSTRACT OF THE DISCLOSURE

A faceplate panel for a cathode ray tube is positioned so that its natural curvature forms a shallow container for a wet solution. A wet solution of photosensitive vitreous slurry is poured onto the internal surface of the faceplate panel and assumes a stable fluid level. The photosensitive vitreous slurry is then exposed to an even dispersion of ultraviolet light from the opposite side of the faceplate panel to photodeposit the suspended vitreous material therein on the internal surface, firstly immediately adjacent the internal surface and then successively inward therefrom until the desired thickness is obtained. The deposited vitreous material then constitutes a dark surround for a color image screen and can be suitably etched to contain apertures therein to allow phosphor dots to be positioned adjacent the internal surface of the panel. After etching the apertures in a predetermined pattern, the panel is then flooded with a photosensitive phosphor slurry of a selected color and exposed to the ultraviolet light source to deposit the suspended phosphor in the apertures.

BACKGROUND

This invention relates to the art of forming color image screens on the faceplate panel of a cathode ray tube. More particularly, the invention relates to improved methods of depositing luminescent and vitreous materials directly from a photosensitive solution onto predetermined regions of the internal surface of the panel to comprise suitable shaped phosphor areas, such as dots, and a dark, light absorbent vitreous surround, respectively.

In producing color image screens employing standard configurations of phosphor dots or discs against a dark, light absorbent background commonly referred to as black surround, various techniques have been used to deposit the phosphor coatings and black surrounds so as to provide the desired matrices of material. Common methods of depositing or forming phosphor dots or vitreous surrounds are the settling of suspended particles from a solution, dusting of particles in powder form on an adhesive surface, or slurrying of particle-carrying photosensitive emulsions as by spin-coating the slurries and photoprinting the desired deposits of particles from the resulting dried coating. All of these recited processes suffer from disadvantages, and in particular, slurrying by spin-coating has the disadvantages of requiring large and expensive machines with capabilities of variable rotation speeds and tilting controls for rotating various sizes and weights of image screens, spilling the generally expensive slurries over the sides of the container-shaped screens, undesirable coating of the skirts of the screen, producing X cross-patterns in the dried coatings, non-uniform application of the coatings in areas surrounding any impurities, clean areas for the bulky spin-coating machines in order to eliminate impurities.

In particular reference to the photoprinting of phosphor dots from spin-coated layers, there are known disadvantages resulting from present photoprinting techniques, as by the use of a source of light emanating toward the internal surface of the screen from a generally rearward position with respect thereto. The disadvantages appear to result from the direction of solidification during the photodepositing process. Solidification takes place in a converging conical pattern toward the screen and when compounded with the use of a point source of light that is not everywhere equidistant to the coating (thus precipitating slightly varying intensities of light incident across the coating), the result is often-times: (1) missing deposits; (2) ragged and irregularly shaped deposits; (3) porous deposits; (4) poor adhesion; and (5) cross-contamination of deposits as caused by growing the deposits over each other.

SUMMARY

It is an object of this invention, therefore, to provide an improved method of depositing preselected matrices of luminescent and vitreous materials on the internal surface of the faceplate panel employing slurrying techniques which do not require spin-coating to form a generally dried self-supporting film.

It is another object of the invention to provide an improved method of depositing materials directly from a photosensitive material-carrying solution onto the internal surface of the panel.

It is still another object to provide an improved method of depositing materials whereby the desired solidification of the material occurs firstly immediately adjacent the internal surface of the panel and then successively outward therefrom.

Further, it is an object to provide a relatively simple and economical method of slurrying whereby a large proportion of the unsolidified slurry is recoverable, and loss of slurry from spillage during spin-coating is eliminated.

In a preferred practice of this invention, a masking means is provided on an internal surface of the interior rear side of a transparent faceplate panel for a cathode ray tube by depositing there on a layer of etchable vitreous material of low light transmissible properties. Dark or opaque, light absorbent vitreous particles are suspended in a soluble photosensitive slurry and applied over the internal surface of the panel when said panel is oriented as a container. The prepared panel is then exposed from its exterior front side to a uniform spread of light rays of the ultraviolet region to photodeposit the vitreous material on the internal surface firstly immediately adjacent thereto and then successively in a direction inward therefrom by rendering the vitreous slurry insoluble where exposed. Next, the masking means is provided with at least a first set of separate and spaced apertures by selectively etching the vitreous layer. Luminescent phosphor particles of a selected color are suspended in a soluble photosensitive slurry, and the first set of apertures filled therewith, whereby the photosensitive luminescent slurry is in direct contact with the internal surface of the apertures. Again the prepared panel is exposed to the ultraviolet light rays to photodeposit the phosphor particles on the internal surface firstly immediately adjacent thereto and then successively in a direction inward therefrom by rendering the luminescent slurry insoluble where exposed, thus forming multiple target areas of phosphor on the panel with a background pattern of dark surround.

Other objects and advantages of the invention will occur to those skilled in the art as the invention is described in connection with the accompanying drawing.

THE DRAWING

DETAILED DESCRIPTION

Figure 1:
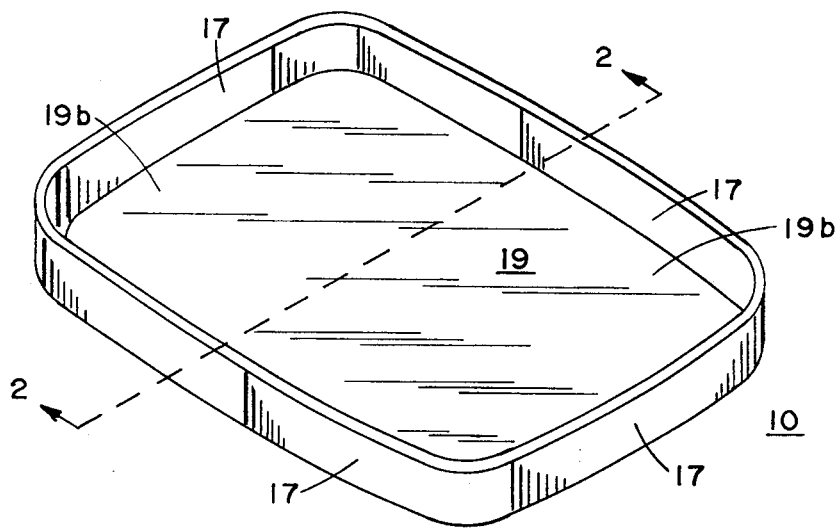
FIG. 1 is a perspective of a relatively shallow container-shaped faceplate panel used in the present invention, and showing its internal surface from the interior rear side thereof.
Figure 1A:
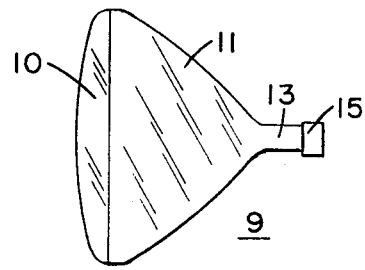
FIG. 1A is a side elevational view of a cathode ray tube employing the faceplate panel of FIG. 1.

In reference to the drawing, FIG. 1 shows a transparent faceplate panel 10 which can be suitably adapted to comprise a color image screen for a cathode ray tube 9, as shown in FIG. 1A. In accordance with known color picture tube construction, the faceplate panel 10 is joined to a funnel portion 11 of the tube 9 which merges into a neck portion 13. The neck portion 13 houses a scanning electron beam system (not shown) which may include three different electron guns, each gun directing a beam of electrons toward the panel 10 which beam is associated with the coloring information of one of three colors, such as green, blue and red, which make up the standard composite image of an image screen. Suitable connectors for energizing the three electron guns within the neck portion 13 project from the tube base 15.

It is well known that color image screens are provided with a plurality of luminescent phosphor dots of the three colors, green, blue and red, arranged in the well known line arrangement across the faceplate for convenient scanning by the electron beam system, and further, that a phosphor dot of each of these colors is normally grouped in a tri-color triad configuration taken from adjacent scanning lines, where the dots are in closely spaced proximity to each other. In each triad, the green, blue and red dots are selectively bombarded by electrons from the associated beams of the scanning electron beam system passing through an apertured shadow mask (not shown) at a particular angle to excite the dots to emit their respective light components to produce the colors of the visible spectrum. It is also known to provide a low light transmissible material, such as dark or opaque, light absorbent pigment or vitreous material,s in the spaces between the dots to constitute a background pattern for the attenuation of reflected ambient light from the panel 10 whereby picture brightness and contrast is greatly improved, the background patterns commonly referred to as dark or black surrounds.

Figure 2:
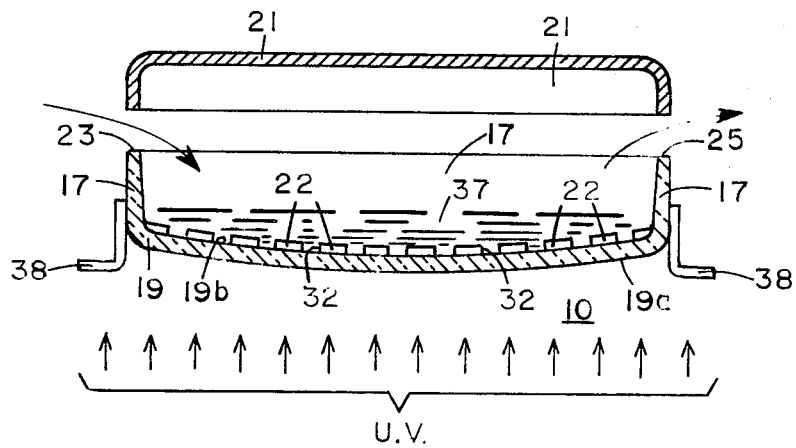
FIG. 2 is a sectional view taken along the line 2—2 of FIG. 1, with the addition of a sectional view of a hood, a photosensitive wet solution, a masking means in contact with preselected areas of the panel and a source of ultraviolet light, marked U.V., emanating toward the panel from its exterior front side.
Figure 3:
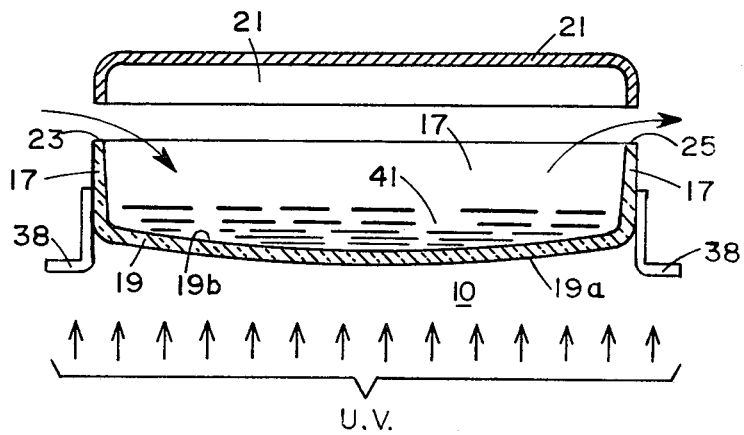
FIG. 3 is a sectional view similar to FIG. 2, but omitting the masking means thereof.

The faceplate panel 10 is, for purposes of convenience, generally rectangular and preferably has side walls or skirts 17 depending outwardly at generally right angles from a front wall 19 having exterior front and interior rear sides 19a and 19b, the interior rear side 19b is clearly shown in FIG. 1. When the faceplate panel 10 is oriented as shown in FIGS. 2 and 3, the concave curvature of the rear side 19b is facing upwardly to present itself as a bottom internal surface of, and the skirts 17 form vertical retaining walls of a generally shallow container or vessel useful to hold the wet solutions from which to deposit predetermined materials to form the color image screens in accordance with the novel processes of the present invention.

Figure 1B:
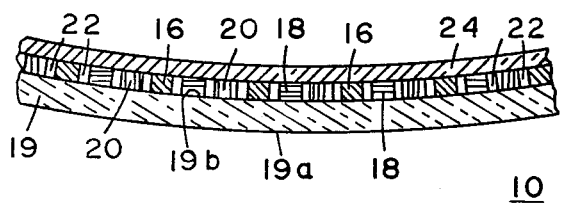
FIG. 1B is an enlarged partial cross-section of a color image screen as formed on the faceplate panel of FIG. 1, and intended for use with the cathode ray tube of FIG. 1A.

FIG. 1B shows the panel 10, when prepared according to the present invention, having separate and interspersed and spaced green, blue, and red phoshpor areas or dots 16, 18 and 20 on the rear side 19b of the front wall 19, a dark or opaque, light absorbent vitreous surround 22 in the spaces between the phosphor dots, and a relatively thin metal film 24 covering the entire structure, the metal film 24 chargeable to high operating voltages and porous to the passage of the electron beam flow in a known manner.

Preferably, during the novel method of depositing the desired materials from the photosensitive solutions onto preselected areas of the internal surface 19b of the panel 10, as will be set forth with greater particularity hereinafter, it is convenient to provide a cover or hood 21 to protect the depository solutions from inadvertent contamination by impurities. Desirably, the hood should be easily removable at any time during any particular process and should have suitable spacing from the upper edge portions of the skirts 17 so as to allow the inflow and outflow of the photosensitive solutions as through the apertures 23 and 25 in FIGS. 2 and 3.

Figure 2A:
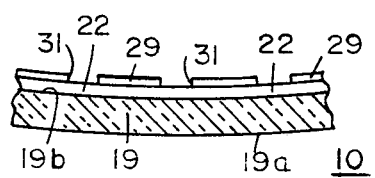
FIG. 2A is an enlarged partial sectional view of the faceplate panel of FIG. 2 and illustrating a particular step in the method of forming the masking means thereof.

In accordance with a novel process of depositing luminescent materials from a luminescent slurry onto the internal surface 19b of the panel 10, the faceplate panel 10 is initially coated with a layer of the dark vitreous surround 22, as best shown in FIG. 2A, having low light transmissible characteristics, for example approximately 10 percent (%) light transmission. The vitreous materials used to comprise the vitreous surround 22 are commercially available glass compositions, preferably in a vitrified or amorphous state and having a relatively low temperature of fusion in the order of 430° C. When combined with an inorganic colorant such as a 1:1 ratio of cobalt to give blue, and manganese to give black, the vitreous materials are effective to appear in a range of dark to opaque and useful to form the desired dark or black surrounds. Next, the panel 10 is oriented with its skirts 17 acting as vertical retaining walls, as shown in FIG. 2, and an emulsion of positive-reacting photosensitive photo-resist, as commonly known in the art, is poured into the vessel, as through the inflow aperture 23, to cover the layer of vitreous surround 22. The emulsion of positive photo-resist is then dried, as by the conventional slurrying process of spin-coating, to form a generally insoluble layer 29 of photo-resist, portions of which are shown in FIG. 2A.

The photo-resist layer 29 of the panel 10 is then exposed to a light source, such as a lighthouse (not shown), through the apertured shadow mask in a common technique whereby the shadow mask has an aperture aligned with a given portion of the resist layer 29 and the underlying layer of surround 22 where a tri-color triad of phosphor dots will subsequently be deposited. In accordance with a well known lighthouse exposure method, the size of the aperture determines the size of the exposure beam, and the alignment of the exposure beam with an electron beam of the scanning electron beam system determintes the angle of incidence for the exposure beam to strike the photo-resist layer 29. It is therefore readily obvious that there is an exposure pattern associated with each of the green, blue and red phosphor dots, and that these patterns are produced from different angles through the aligned apertures of the shadow mask whereby the exposed portions of the layer 29 from each exposure pattern are separate and spaced from each other, and also the exposed portions from each exposure pattern are separate and spaced from those of the other two exposure patterns.

The effect of the light exposure on the photo-resist layer 29 is to render the resist soluble to known developers or washing solutions. When the photo-resist layer 29 is exposed in the green exposure pattern and the soluble resist areas are removed as with a developer, a first set of separate and spaced apertures 31 is formed in the resist layer 29, as shown in FIG. 2A, to expose portions of the underlying vitreous surround 22 in preparation for a forthcoming etching step. In the same manner, second and third sets of separate and spaced apertures 33 and 35, FIG. 2B, can be formed in the resist layer 29 corresponding to the blue and red exposure patterns respectively, at such time in the particular method being used that it is required to etch the surround 22.

With the panel 10 prepared as shown in FIG. 2A, with only the first set of apertures 31 in the resist layer 29, the panel 10 is now ready for the etching step wherein it is necessary to remove the exposed portions of the surround 22 in order to place the green phosphor dots 16 on the internal surface 19b of the front wall 19. Therefore, the panel 10 is coated with a suitable chemical etchant, which can be weak acids that will not etch the front wall 19 such as dilute nitric or acetic acids so that the etchant is in direct contact with the exposed portions of the surround 22 but is otherwise in direct contact with the resist layer 29. It is commonly known to select chemical etchants which are active to etch only the surround 22 with the resist layer 29 and the panel 10 being impervious thereto. Also, it is reasonably expected that other etchants can be suitably chosen, including strong acids such as hydrofluoric or hydronitric acids, to etch the known compositions of vitrified materials which can comprise the surround 22.

Figure 2B:
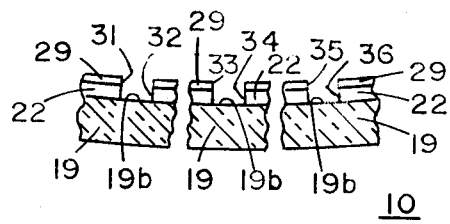
FIG. 2B is broken enlarged sectional view of three separate pieces of the faceplate panel of FIG. 2, each illustrating another particular step in the method of forming the masking means thereof.

During the etching process, the etchant is active to provide a first set of separate and spaced apertures 32 in the vitreous surround 22, as shown in FIG. 2B, to expose portions of the underlying internal surface 19b of the front wall 19 of the panel 10. The apertures 31 in the resist layer 29 and apertures 32 in the surround 22, and the exposed portions of the internal surface 19b are of substantially the same size and shape. In the same manner, when the second and third sets of apertures 33 and 35 in the resist layer 29 are used as the etching format, second and third sets of separate and spaced apertures 34 and 36, respectively, can be etched in the surround 22 and corresponding to the size and shape therof. Optionally, the resist layer 29 can be removed, as through the use of known organic solvents, following the etching of apertures 32 and a fresh resist layer applied as explained previously from which to provide the apertures 33 comprising the blue exposure pattern. Still a fresh resist layer could be used to provide the apertures 35 comprising the red exposure pattern, or alternatively, the same resist layer can be used to provide all three sets of apertures 31, 33 and 35.

FIG. 2 shows the panel 10 positioned in the abovementioned vessel orientation suitably for holding wet solutions, and covered by the hood 21. The internal surface 19b of the front wall 19 is coated with the surround 22 including the first set of apertures 32 corresponding to the green exposure pattern. The resist layer 29 with its first set of apertures 31 has been removed, thereby leaving the surround 22 as the sole means for masking the internal surface 19b of the front wall 19 whereby the exposed portions of the internal surface 19b in the apertures 32 constitute preselected areas of the front wall 19 for the depositing of phosphor dots. As thus prepared with the vitreous surround 22 comprising a masking means, the panel 10 is then covered with a wet solution comprised of a negative-reacting soluble photosensitive phosphor emulsion or slurry 37, containing luminescent phosphor particles responsive to electron bombardment to emit light of a first primary color, such as green, which phosphor particles are suspended in the photosensitive slurry in preferably a generally homogeneous dispersion. This green phosphor slurry 37 can be poured into the panel 10 through the inflow aperture 23 so as to at least fill the apertures 32. Although the green phosphor slurry 37 has been described as a negative-reacting solution, it is known to provide a positive-reacting slurry if desired.

Next, the panel 10 is exposed to a generally uniform flood of ultraviolet light, indicated on the drawing by U.V., from the front side 19a of the front wall 19 which partially comprises the exterior front side of the panel 10, to expose the green phosphor slurry 37 filling the apertures 32. Preferably, the flooding area can be larger than the area of the front wall 19 with a circumferential shield 38 provided so as to obtain a good light dispersion in the outer peripheral areas of the front wall 19. The exposure of the slurry to the photoenergy renders it insoluble and causes the insoluble portion thereof to adhere to the internal surface 19b of the front wall 19 firstly immediately adjacent the internal surface and then successively in a direction inward therefrom until solidified luminescent phosphor areas of a desired thickness are deposited in the apertures 32 to form the green phosphor dots 16. The apertures 31 and 32 are generally circular and the green phosphor dots 16 correspond to the shape thereof.

The direction of the exposure and resulting solidification of the phosphor dots is of particular interest since formerly phosphor dots were photoprinted or photodeposited from a selected phosphor slurry from a "rear" light exposure in a similar manner to the exposure of the photo-resist layer 29 discussed previously hereto, as distinguishable from the "front" exposure of the present invention. In the rear exposures, the solidifications of the phosphor into insoluble deposits was in the shape of a converging conical pattern increasing in a direction toward the panel 10, rather than in a direction away from the panel 10, so as to sometimes cause insufficient solidification of the phosphor deposits in the region of the apex near the panel 10 and hence poor adhesion and shape in the critical area adjacent the internal surface 19b of the front wall 19.

In the present method of depositing phosphor by the front exposure technique, the critical area adjacent the internal surface 19b is firstly covered by a solidified layer of insoluble phosphor and then solidification occurs successively inward to the solution and away from the surface 19b until an insoluble phosphor deposit is obtained in the apertures 32 of a desired thickness. The desired degree of density of the phosphor deposits is more readily obtained because the solidification occurs directly from the gren phosphor slurry 37 instead of photoprinting from a spin-coated layer of phosphor slurry. It is obvious as well that an even exposure pattern of light is more readily obtainable by the front exposure technique because it is no longer necessary to use the lighthouse shadow mask assembly with the rear exposure technique, thus enabling one to more substantially apply the same amount of light intensity to each aperture 32 to eliminate missing phosphors, ragged and irregular shaped phosphors, and phosphors with varying densities and thicknesses.

As thus far described, the preferred method of forming the color image screen of FIG. 1B has been to start with the panel 10 with its front wall 19 coated first with the layer of surround 22 and secondly with the photo-resist layer 29, then expose the resist layer 29 in the green exposure pattern for the green phosphor dots 16, etch the surround 22 for the green phosphor dots 16, remove the resist layer 29, coat the prepared panel 10 with the green phosphor slurry 37 and flood with ultraviolet light from a front exposure to photodeposit the green phosphor dots 16. Thereafter, drain off the excess soluble green slurry 37, as through the outflow aperture 25 and after thoroughly cleaning the panel 10, reapply a coating of the photoresist over the surround 22 and the green dots 16.

Next, expose the reapplied resist layer 29 to the blue exposure pattern, etch out the exposed portions of the underlying surround 22 to form the second set of apertures 34, and remove the etchant and resist layer 29 from the panel 10. Pour a negative-reacting soluble photosensitive phosphor slurry (not shown) containing phosphors responsive to emit light of a second primary color, such as blue, through the inflow aperture 23 onto the panel 10 so as to at least fill the apertures 34 with blue phosphor slurry. As shown in FIG. 2, expose the panel 10 and the blue slurry in the apertures 34 to the front exposure pattern of ultraviolet light to photo-deposit the blue phosphor dots 18 in said apertures 34. It will be appreciated that the reapplied resist layer 29 separates the blue slurry from any light exposure that would be available through the previously deposited green dots 16.

After drawing off the excess blue slurry through the outflow aperture 25, thoroughly clean the panel 10. Next, repeat the above-recited steps for photodepositing the blue phosphor dots 18 to photodeposit the red phosphor dots 20, namely, reapply the resist layer 29, expose for the red exposure pattern, etch the surround 22 for the third set of apertures 36, remove the etchant and resist layer 29, pour on a phosphor slurry (not shown) responsive to emit light of a third primary color, such as red, and expose to the ultraviolet light.

In an alternative method of forming the color image screen of FIG. 1B, the same resist layer can be used from which to expose for the green, blue and red exposure patterns as follows: expose the resist layer 29 of the double layer of surround 22 and resist 29 for the green exposure pattern to form the apertures 31; etch the surround 22 for the apertures 32; photodeposit from the green slurry 37 the green phosphor dots 16 in the apertures 32; re-expose the resist layer 29 in its previously unexposed portions for the blue exposure pattern to form the apertures 33; etch the surround 22 for the apertures 34; photodeposit from the blue slurry the blue phosphor dots 18 in the apertures 34; re-expose the resist layer 29 in its previously unexposed portions for the red exposure pattern to form the apertures 35; etch the surround 22 for the apertures 36; and photodeposit from the red slurry the red phosphor dots 20 in the apertures 36.

It is to be noted that in the first disclosed method, the reapplied resist layers 29 prevented the ultraviolet light which passed through the earlier photodeposited phosphor dots from exposing the newly applied slurries, and the result was that only the phosphor slurry in the freshly etched apertures of the surround was exposed. However, it has been found that the resist layer 29 can be retained for multiple exposures to the lighthouse since the green, blue and red exposure patterns do not overlie common areas of the resist; and the time of exposure can be controlled so that the difference in intensity of exposure in the slurry filled apertures to that of the phosphor filled apertures will permit the next set of phosphor dots to be formed before the slurry touching the tops of the phosphor dots can solidify. Of course, any slight solidification of the different color phosphor slurry on the heretofore solidified phosphor dots, as blue slurry on green dots and red slurry on green and blue dots, will give undesirable color contamination, and for that reason, the other method may be preferred.

Still another alternative variation to the above-recited methods of forming the color image screen of FIG. 1B is as follows: expose the resist layer 29 successively for the green, blue and red exposure patterns to form apertures 31, 33 and 35; etch simultaneously the apertures 32, 34 and 36 for the green, blue and red dots, respectively; remove the etchant and resist layer 29; reapply a fresh resist layer 29 and expose it for the green exposure pattern to reform the apertures 31; and photodeposit from the green slurry the green dots 16 in the now exposed apertures 32 (the reapplied resist layer being effective to cover the apertures 34 and 36 to prevent the green slurry from filling these apertures as well as to prevent exposure to the ultraviolet light during photodepositing of the green dots 16).

Thereafter, if it is not convenient to control the time of exposure during photodepositing the phosphor dots to thus prevent color contamination, the resist layer 29 is removed and a fresh layer 29 reapplied to thus cover the previously deposited green dots 16. Next, the fresh layer 29 is exposed for the blue exposure pattern to reform the apertures 33, the blue slurry is poured over the panel 10 filling the apertures 34, and the blue slurry is then exposed to the ultraviolet light to photodeposit the blue phosphor dots 18 in the apertures 34.

Again, the resist layer 29 is removed and a fresh layer 29 reapplied to thus cover the previously deposited green and blue dots 16 and 18. The fresh resist layer 29 is then exposed to the red exposure pattern to reform the apertures 35 (in practice the apertures 31, 33 and 35 constitute a reopening of the etched apertures 32, 34 and 36, respectively, in the surround 22 because the reapplied resist layer 29 partially fills these apertures in the reapplication of the resist). The red slurry is then poured over the panel 10 filling the apertures 36, and the red slurry is exposed to the ultraviolet light to photodeposit the red phosphor dots 20 in the apertures 36.

Optionally, if the time exposure can be satisfactorily controlled, subsequently to photodepositing the green phosphor dots 16 in the apertures 32, the first reapplied resist layer 29 can be exposed to the blue exposure pattern to reform the apertures 33, then the blue slurry added to at least fill the apertures 34 and exposed to the ultraviolet light to photodeposit the blue phosphor dots 18 in the apertures 34. Thereafter, the first reapplied layer is exposed to the red exposure pattern to reform the apertures 35, then the red slurry added to at least fill the apertures 36 and exposed to ultraviolet light to photodeposit the red phosphor dots 20 in the apertures 36.

It is therefore now possible, by using the above-recited methods of depositing luminescent materials directly from a photosensitive solution by direct exposure to ultraviolet light, to form a color image screen on the panel 10 whereby phosphor dots are obtained from conventional phosphor slurries without the requirement for spin-coating the slurries prior to their being photoprinted. The present invention is hence applicable to depositing other desired materials directly from a photosensitive solution, and is a novel way of obtaining the vitreous surround 22.

FIG. 3 shows the panel 10 oriented as in FIG. 2 and with the hood 21 provided to protect against inadvertent contamination by impurities. A negative-reacting soluble photosensitive vitreous emulsion or slurry 41 is poured onto the panel 10 as through the inflow aperture 23. The vitreous slurry 41 preferably contains either powders or fine crystals or other particles of the vitreous materials of low light transmissible properties that were heretofore discussed relative to the surround 22 combined with commonly known fish-glue type resists. The prepared panel 10 with the vitreous slurry 41 is then exposed to the ultraviolet light in the same front exposure technique to photodeposit from the vitreous slurry 41 a generally insoluble solidified layer of vitreous material suitable to constitute the vitreous surround 22. As in the photodepositing of the luminescent materials, the direction of solidification is firstly on the internal surface 19b of the front wall 19 and then successively in a direction away therefrom or inward of the slurry 41, gives the resulting surround 22 the desired adhesion, thickness, and density. After the exposure, the excess vitreous slurry 41 can be poured off as through the outflow aperture 25. The entire internal surface 19b, the green, blue and red dots 16, 18 and 20, and the surround 22 can then be covered by the metal film 24 to complete the construction of the color image screen.

The invention has been described in detail with particular reference to the drawing, but it will be understood by those skilled in the art to which the invention pertains that various modifications and variations can be made without departing from the spirit and scope thereof, and to this extent the appended claims are intended to cover the same.

I claim:

1. A method of depositing an image screen on the interior surface of a faceplate panel useful in a cathode ray tube of a television receiver, said method comprising the steps of:

covering the entire interior surface of said panel with a photosensitive vitreous slurry containing a distribution of vitreous particles having low light transmissible properties, exposing said vitreous slurry through said panel to a generally uniform dispersion of actinic energy to solidify the exposed vitreous slurry in a pattern firstly immediately adjacent to the interior surface of said panel and then successively in a direction inwardly therefrom to form a solid vitreous layer, removing the unsolidified vitreous slurry from said panel, and selectively etching said vitreous layer to form a first set of apertures therethrough to expose the underlying panel in predetermined areas for subsequent deposition of multiple phosphor areas thereon, said vitreous layer comprising a background surround for said multiple phosphor areas of the cathode ray tube.

2. A method as claimed in claim 1 further including the steps of: pouring a first photosensitive luminescent slurry containing a distribution of first color phosphor particles over said vitreous layer and into said first set of apertures, exposing said first luminescent slurry in said first set of apertures through said panel to a generally uniform dispersion of actinic energy to solidify the exposed luminescent slurry in a pattern firstly immediately adjacent to the interior surface of said panel and then successively in a direction inwardly therefrom, and removing the unsolidified luminescent slurry, the solidified areas in said first set of apertures comprising multiple electron target areas within the background surround formed by said vitreous layer.

3. A method as claimed in claim 2 further including the steps of: selectively etching a second set of separate and spaced apertures at locations different from the locations of said first set of apertures in said vitreous layer to expose the underlying panel therethrough, pouring a second photosensitive luminescent slurry containing a distribution of color phosphor particles different from said first color phosphor particles over said layer and into said second set of apertures, and exposing said second luminescent slurry to actinic energy through said panel to solidify said second luminescent slurry in said second apertures, thereby providing selective deposition of phosphor areas.

4. A method as claimed in claim 1 wherein said vitreous particles comprise a 1:1 ratio of vitreous material and a dark, light absorbent colorant selected from the group consisting of cobalt and manganese.

References Cited

UNITED STATES PATENTS

| | | | |
|---|---|---|---|
| 3,067,349 | 12/1962 | Kasperowicz et al. | 96—36.1 UX |
| 3,224,895 | 12/1965 | Rebel | 96—36.1 |
| 3,146,368 | 8/1964 | Fiore et al. | 96—36.1 X |

RALPH S. KENDALL, Primary Examiner

C. WESTON, Assistant Examiner

U.S. Cl. X.R.

96—36.1